United States Patent
Terada et al.

(10) Patent No.: US 7,845,342 B2
(45) Date of Patent: Dec. 7, 2010

(54) CRANKCASE FOR INTERNAL COMBUSTION ENGINE

(75) Inventors: Tatsuhiro Terada, Toyota (JP); Yasushi Iwata, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 128 days.

(21) Appl. No.: 12/358,290

(22) Filed: Jan. 23, 2009

(65) Prior Publication Data

US 2009/0188478 A1 Jul. 30, 2009

(30) Foreign Application Priority Data

Jan. 25, 2008 (JP) .............................. 2008-015379

(51) Int. Cl.
*F01M 13/04* (2006.01)

(52) U.S. Cl. ...................................... 123/572; 123/573

(58) Field of Classification Search ......... 123/572–574, 123/41.86
See application file for complete search history.

(56) References Cited

U.S. PATENT DOCUMENTS

| | | | | |
|---|---|---|---|---|
| 4,667,647 A | * | 5/1987 | Ohtaka et al. | ................ 123/573 |
| 6,425,451 B2 | * | 7/2002 | Yoshida et al. | .............. 180/219 |
| 2004/0159313 A1 | * | 8/2004 | Obayashi et al. | ............ 123/572 |
| 2006/0260589 A1 | * | 11/2006 | Shieh | .......................... 123/572 |

FOREIGN PATENT DOCUMENTS

| | | |
|---|---|---|
| JP | 57-172109 U | 10/1982 |
| JP | 04-214917 A | 8/1992 |
| JP | 2006-336595 A | 12/2006 |

* cited by examiner

*Primary Examiner*—M. McMahon
(74) *Attorney, Agent, or Firm*—Sughrue Mion, PLLC

(57) ABSTRACT

A crankcase that is provided in an internal combustion engine, in which blow-by gas is returned to an intake passage via a gas outflow passage formed in a cylinder block so as to extend in a direction from an upper portion to a lower portion of the cylinder, includes: a partition wall extending in a direction from an upper portion to a lower portion of the crankcase and facing an inner side surface of a crankcase outer wall that also extends in the direction from the upper portion to the lower portion of the crankcase; an internal space that is formed between the partition wall and the inner side surface of the crankcase outer wall and connected to the gas outflow passage at an upper end of the internal space; and a window that is formed on the partition wall to communicate an inside and outside of the internal space.

5 Claims, 6 Drawing Sheets

CRANKCASE FOR INTERNAL COMBUSTION ENGINE

INCORPORATION BY REFERENCE

The disclosure of Japanese Patent Application No. 2008-015379 filed on Jan. 25, 2008 including the specification, drawings and abstract is incorporated herein by reference in its entirety.

BACKGROUND OF THE INVENTION

1. Field of the Invention

This invention relates to a crankcase for an internal combustion engine.

2. Description of the Related Art

In an internal combustion engine mounted in a vehicle such as an automobile, blow-by gas treatment for returning gas containing fuel to an intake passages, because the gas containing fuel leaks from a combustion chamber to a crankcase through a space between a cylinder inner wall and a piston ring (blow-by gas) during the operation of the internal combustion engine.

When the blow-by gas that leaks from the combustion chamber to the crankcase is returned to the intake passage by means of the blow-by gas treatment, this blow-by gas flows into a gas outflow passage extending in a vertical direction from the crankcase to a cylinder block of the internal combustion engine, and reaches the intake passage via the gas outflow passage. When the blow-by gas passes through the gas outflow passage extending in the vertical direction, the oil contained in the blow-by gas separates from the gas by using the self-weight of the oil, and the remaining blow-by gas without the oil is returned to the intake passage. The oil separated from the blow-by gas in the gas outflow passage, on the other hand, is returned from the gas outflow passage into the crankcase.

Moreover, it is considered that the gas outflow passage can be connected to an oil separator described in, for example, Japanese Patent Application Publication No. 2006-336595 (JP-A-2006-336595) (paragraphs [0015], [0016], [0018], and [0024], for example), in order to separate the oil from the blow-by gas more effectively. This oil separator introduces the blow-by gas from the gas outflow passage and adheres the oil contained in the gas to a separation wall by abutting the flow of the gas against the separation wall, in order to separate the oil from the gas. In this case, because the blow-by gas from which the oil is separated as the blow-by gas passes through the gas outflow passage is further separated from the oil by the oil separator and returned to the intake passage, the oil can be separated from the blow-by gas more effectively. Note that the oil that is separated from the blow-by gas by the oil separator is also returned from the gas outflow passage into the crankcase.

As described above, the oil can be separated effectively from the blow-by gas that is returned to the intake passage, by separating the oil from the blow-by gas by means of the gas outflow passage or oil separator. However, it is preferred that the oil be separated as much as possible from the blow-by gas that is returned to the intake passage, and the oil needs to be separated from the gas more effectively.

SUMMARY OF THE INVENTION

This invention provides a crankcase for an internal combustion engine that realizes more effective separation of oil from blow-by gas of the crankcase when returning the blow-by gas into an intake passage.

A crankcase for an internal combustion engine according to a first aspect of this invention is a crankcase that is provided in an internal combustion engine, in which blow-by gas that leaks from a combustion chamber into the crankcase is returned to an intake passage via a gas outflow passage formed in a cylinder block so as to extend in a direction from the upper portion of the cylinder block to the lower portion of the cylinder block. The crankcase has a partition wall extending in a direction from an upper portion of the crankcase to a lower portion of the crankcase and facing an inner side surface of a crankcase outer wall that also extends in the direction from the upper portion of the crankcase to the lower portion of the crankcase, an internal space part that is formed between the partition wall and the inner side surface of the crankcase outer wall and connected to the gas outflow passage at an upper end of the internal space part, and a window that is formed on the partition wall to extend thorough the partition wall in a direction perpendicular to the partition wall to communicate inside and outside of the internal space part.

The blow-by gas that flows from the crankcase toward the intake passage via the gas outflow passage is separated from oil when passing through the gas outflow passage, and thereafter returned to the intake passage. According to the first aspect, in addition to the separation of the oil from the blow-by gas in the gas outflow passage, the separation of the oil from the blow-by gas is performed when the blow-by gas flows from the crankcase to the gas outflow passage. Specifically, the blow-by gas within the crankcase flows horizontally into the internal space via the window formed on the partition wall, the internal space being formed between the partition wall and a case inner side surface. Then, when this blow-by gas comes into contact with the case inner side surface, the oil contained in the gas adheres to the case inner side surface and is separated from the blow-by gas. Thereafter, the blow-by gas separated from the oil flows from an upper part of the internal space to the gas outflow passage. As a result, the oil is separated from the blow-by gas on the crankcase side (in the internal space), and thereafter the oil is separated from the blow-by gas on the gas outflow passage side as well. Therefore, when the blow-by gas within the crankcase is returned to the intake passage, the oil can be separated from this blow-by gas further effectively.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, wherein.

DETAILED DESCRIPTION OF EMBODIMENTS

Hereinafter, a first embodiment in which the invention is applied to an internal combustion engine for an automobile is described with reference to FIGS. 1 to 3.

Figure 1:
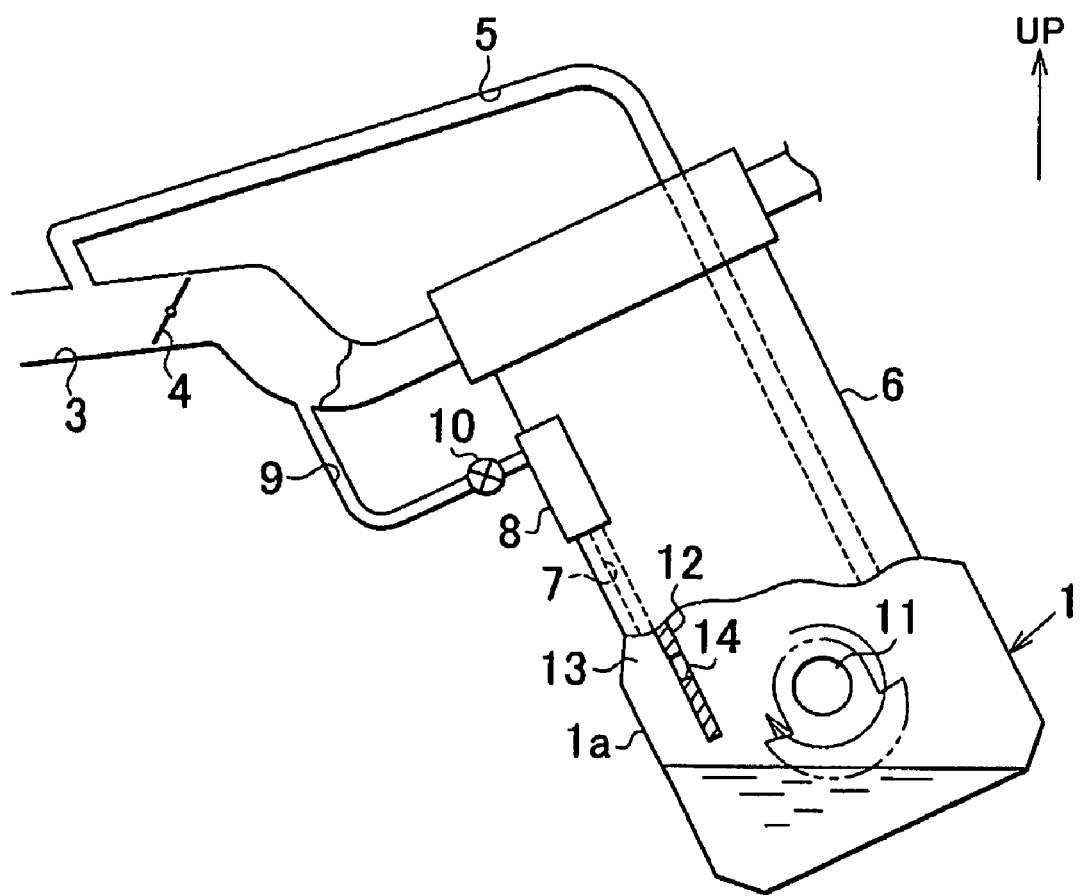
FIG. 1 is a schematic diagram showing an internal combustion engine provided with a crankcase of a first embodiment of the invention.

In an internal combustion engine shown in FIG. 1, a blow-by gas treatment device executes blow-by gas treatment for returning, to an intake passage 3, blow-by gas that leaks from a combustion chamber into a crankcase 1 during the operation of the internal combustion engine.

This device has a fresh air introducing passage 5 that is connected to an upstream section of a throttle valve 4 of an intake passage 3 and introduces fresh air into the crankcase 1, and a gas outflow passage 7 that is connected to the inside of the crankcase 1 and extends in a direction from an upper portion of a cylinder block 6 to a lower portion of the cylinder block 6 in a cylinder block 6 so as to cause the blow-by gas within the crankcase 1 to flow out. In this device, by introducing the fresh air from the fresh air introducing passage 5 into the crankcase 1, the blow-by gas with volatile fuel that is present in the crankcase 1 flows out of the gas outflow passage 7. This blow-by gas is then returned to a downstream section of the throttle valve 4 of the intake passage 3 via the gas outflow passage 7, an oil separator 8, and a return passage 9. Note that a flow control valve 10 for adjusting a gas flow rate when returning the blow-by gas to the intake passage 3 is provided in the middle of the return passage 9.

When the blow-by gas to be returned to the intake passage 3 passes through the gas outflow passage 7, oil contained in the blow-by gas is separated from the blow-by gas using its self-weight. The blow-by gas from which the oil is separated by the gas outflow passage 7 then is further separated from the oil by the oil separator 8 and returned to the intake passage 3. On the other hand, the oil that is separated from the blow-by gas by the gas outflow passage 7 and oil separator 8 is returned into the crankcase 1 via the gas outflow passage 7. It is considered that an oil separator that adheres the oil contained in the blow-by gas taken from the gas outflow passage 7 to a separation wall by abutting the flow of the gas against the separation wall and then separates the oil from the gas can be employed as the oil separator 8.

As described above, the oil can be separated from the blow-by gas to be returned to the intake passage 3, by separating the oil from the blow-by gas by means of the gas outflow passage 7 or the oil separator 8. However, it is preferred that the oil be separated as much as possible from the blow-by gas that is returned to the intake passage 3, and the oil needs to be separated from the gas more effectively.

Especially when the internal combustion engine is inclined so as to tilt the gas outflow passage 7 with respect to the vertical direction, as shown in FIG. 1, the oil needs to be separated further effectively from the blow-by gas that is returned to the intake passage 3. The reason is that the separation of the oil from the blow-by gas passing through the gas outflow passage 7 by means of its self weight is performed most effectively when the passage 7 extends in the vertical direction, but when the gas outflow passage 7 is tilted with respect to the vertical direction the oil is separated from the blow-by gas passing through the passage 7 inefficiently due to the inclination of the passage 7.

When a crankshaft 11 of the internal combustion engine rotates the oil accumulated in the crankcase 1 in a direction for stirring up the oil toward a lower end opening side of the gas outflow passage 7 (the direction of the arrow shown in FIG. 1), the oil needs to be separated more effectively from the blow-by gas that is returned to the intake passage 3. The reason is that the oil stirred up by the rotation of the crankshaft 11 is mixed easily with the blow-by gas flowing through the gas outflow passage 7, which makes it insufficient to separate the oil from the blow-by gas passing through the gas outflow passage 7.

In this embodiment, in order to separate the oil more effectively from the blow-by gas that is returned to the intake passage 3, not only the oil is separated from the blow-by gas by means of the gas outflow passage 7 or the oil separator 8, but also the oil is separated from the gas when the blow-by gas flows from the crankcase 1 into the gas outflow passage 7. Therefore, according to this embodiment, (1) the oil is separated from the blow-by gas on the crankcase 1 side as well, whereby the oil can be separated from the blow-by gas further effectively when returning the blow-by gas within the crankcase 1 into the intake passage 3. Even under above described circumstances, the separation of the oil from the blow-by gas to be returned to the intake passage 3 can be performed at more than necessary level.

Next, the structure for separating the oil from the blow-by gas on the crankcase 1 side is explained. In a section corresponding to an opening of the gas outflow passage 7 in an upper part of the inside of the crankcase 1, there is formed a partition wall 12, which extends in a direction from an upper portion of the crankcase 1 to a lower portion of the crankcase 1, faces an inner side surface of an outer wall 1a, which extends in the direction from the upper portion of the crankcase 1 to the lower portion of the crankcase 1 (case inner side surface). By forming this partition wall 12, an internal space 13 that is connected to the gas outflow passage 7 at an upper end of the internal space 13 is formed between the partition wall 12 and the inner side surface of the outer wall 1a. In addition, a window 14 that is formed on the partition wall 12 to extend thorough the partition wall 12 in a direction perpendicular to the partition wall 12 to communicate the inside and outside of the internal space 13. The blow-by gas within the crankcase 1 flows from this window 14 into the internal space 13 and then to the gas outflow passage 7.

Figure 2:
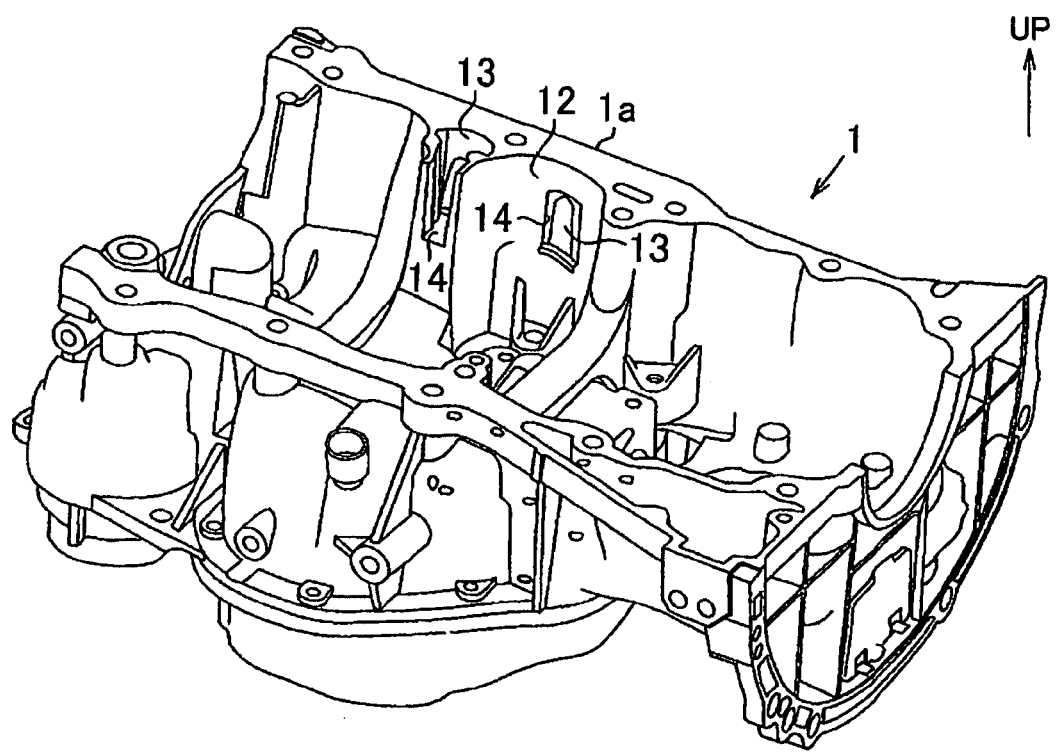
FIG. 2 is a perspective view of the crankcase, showing a partition wall and window that are formed inside the crankcase of the first embodiment.
Figure 3:
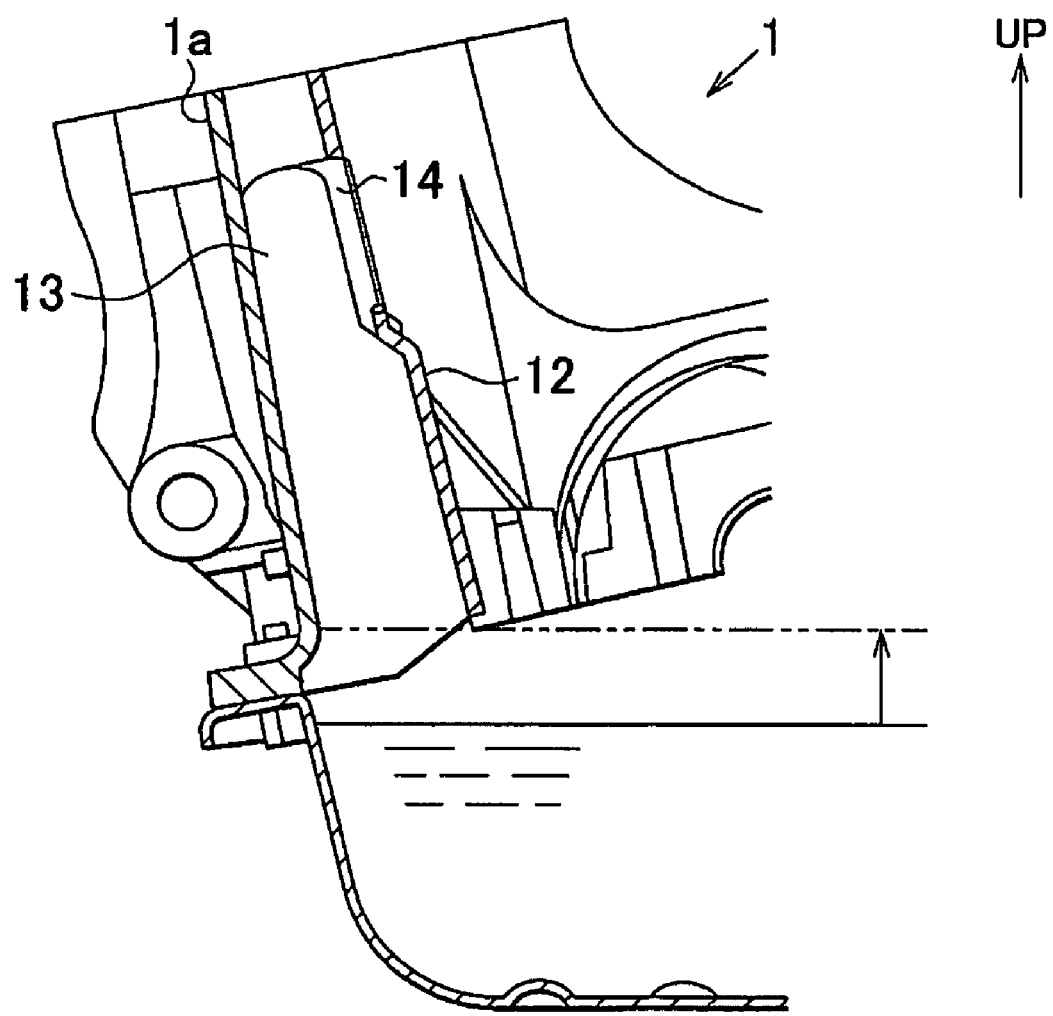
FIG. 3 is an enlarged cross-sectional diagram of the crankcase, showing the partition wall and the window shown in FIG. 2.

FIG. 2 is a perspective view of the crankcase 1, showing the partition wall 12 and the window 14 that are formed inside the case 1. The opening area of the window 14 formed on the partition wall 12 is so set that the oil accumulated within the crankcase 1 is not drawn up from a lower end opening of the internal space 13, when the surface of the oil rises as high as or to a level near the lower end opening of the internal space 13 at the lower end of the partition wall 12 as shown by an arrow in FIG. 3. In other words, the opening area of the window 14 is set at a value at which the flow rate of the blow-by gas flowing into the internal space 13 through the window 14 does not become high enough to draw up the oil, when the case of the above-described situation occurs.

When the surface of the oil accumulated in the crankcase 1 rises as high as or to the level near the lower end opening of the internal space 13, excessively low opening area of the window 14 causes the following problems. Specifically, the flow rate of the blow-by gas flowing into the internal space 13 via the window 14 is reduced, and accordingly the flow rate of the blow-by gas flowing from the lower end opening of the internal space 13 into the internal space 13 increases. As a result, the amount of oil drawn up to the internal space and the amount of blow-by gas increase. If a large amount of oil is drawn up from the lower end opening of the internal space 13 as described above, the drawn up oil is mixed into the blow-by gas flowing inside the internal space toward the gas outflow passage 7, and, as a result, the oil cannot be separated from the blow-by gas on the crankcase 1 side effectively.

However, according to this embodiment, (2) the oil can be prevented from being mixed with the blow-by gas as the oil is drawn up, the blow-by gas flowing inside the internal space 13 toward the gas outflow passage 7. Therefore, the mixing of the oil with the blow-by gas can be inhibited so that the oil can be separated from the blow-by gas effectively on the crankcase 1 side.

According to this embodiment, (3) the blow-by gas within the crankcase 1 flows horizontally into the internal space 13 through the window 14 formed on the partition wall 12, the internal space 13 being formed between the partition wall 12 and the inner side surface of the outer wall 1a of the case 1. When the blow-by gas comes into contact with the inner side surface of the outer wall 1a, the oil contained in the case adheres to the inner side surface and is then separated from the blow-by gas. Thereafter, the blow-by gas from which the oil is separated flows from the upper part of the internal space 13 into the gas outflow passage 7 (FIG. 1), and the oil is separated from the blow-by gas by the passage 7 and the oil separator 8. The oil is separated from the blow-by gas on the crankcase 1 side (inside the internal space 13) in the manner described above, and thereafter the oil is further separated from the blow-by gas by the gas outflow passage 7 and the oil separator 8. Therefore, the oil can be separated from the blow-by gas further effectively, when returning the blow-by gas contained in the crankcase 1 to the intake passage 3.

Note that the oil separated from the blow-by gas within the internal space 13 is returned from the lower end opening of the internal space 13 to a lower part of the crankcase 1. The oil that is separated from the blow-by gas by the gas outflow passage 7 and the oil separator 8 also falls from the passage 7 into the internal space 13 and then returned from the lower end opening of the internal space 13 to the lower part of the crankcase 1.

Figure 4:
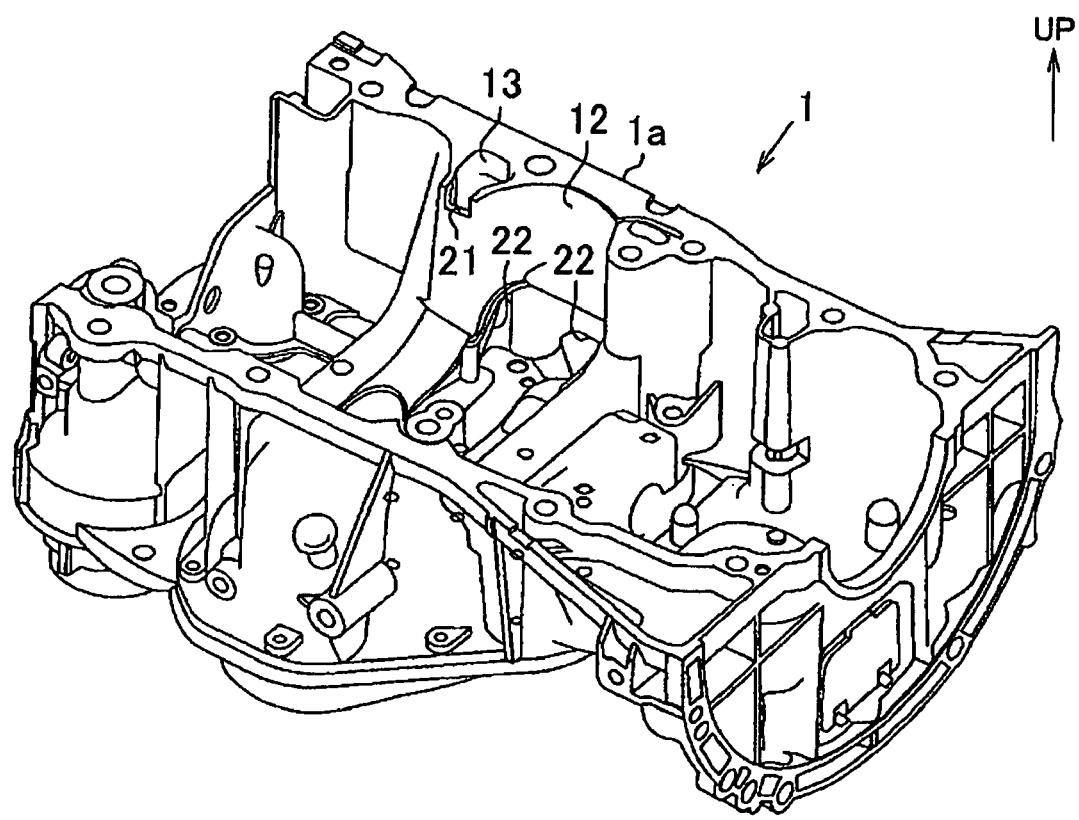
FIG. 4 is a perspective view showing a crankcase of a second embodiment of the invention.
Figure 5:
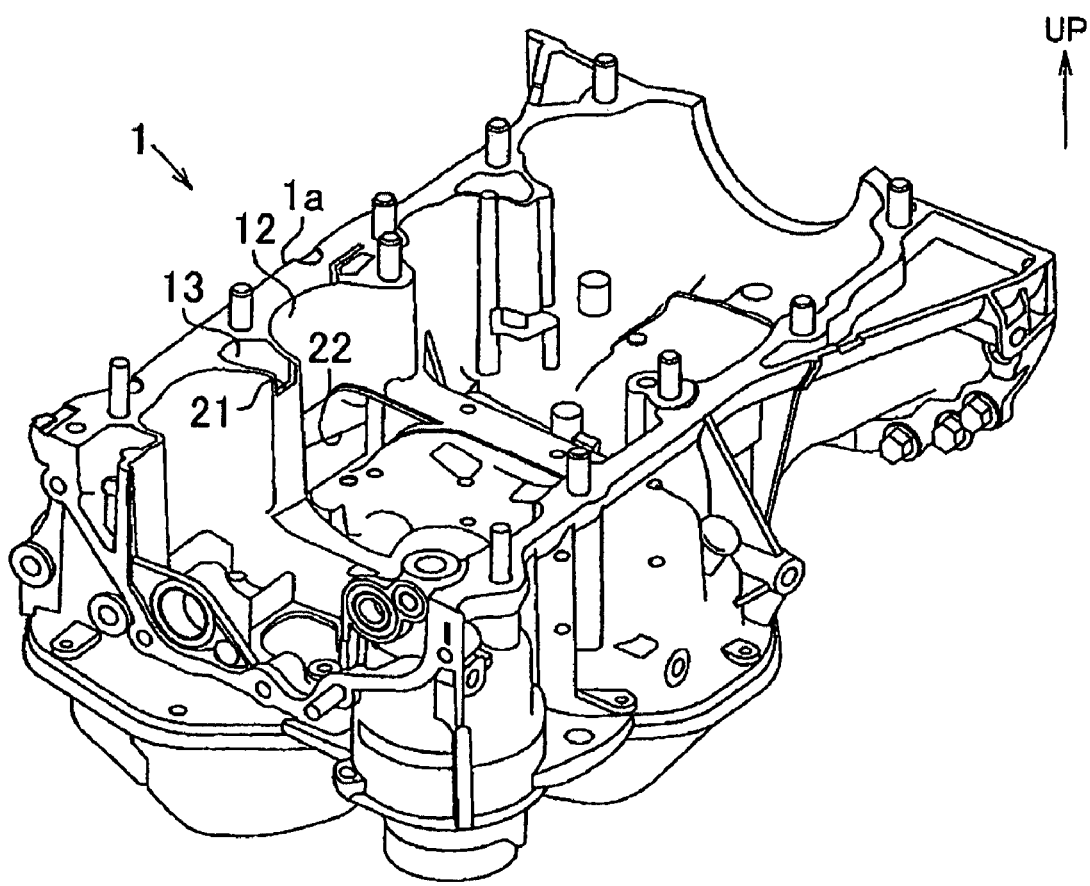
FIG. 5 is a perspective view showing the crankcase of the second embodiment.
Figure 6:
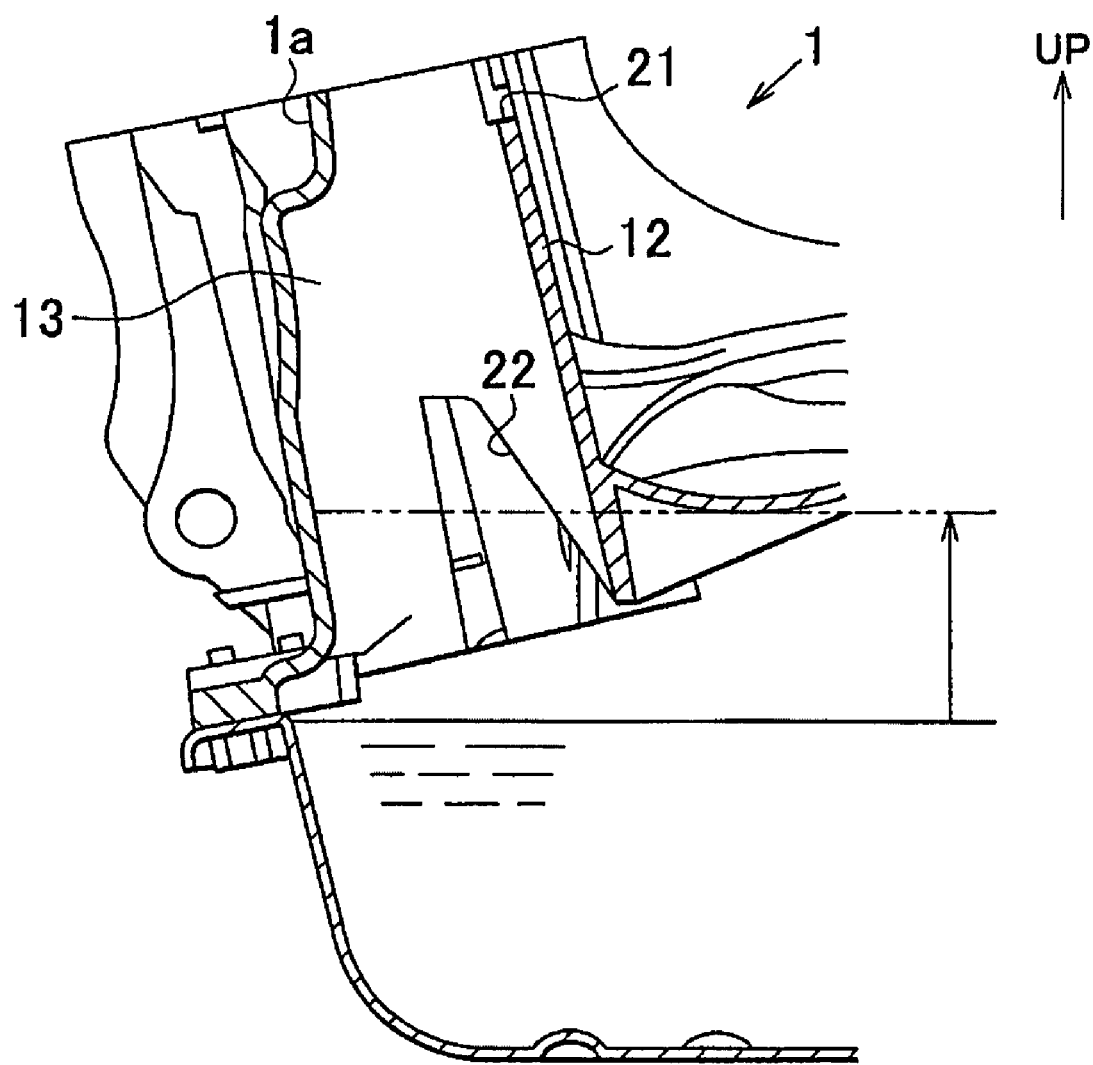
FIG. 6 is an enlarged cross-sectional diagram of the crankcase, showing a partition wall and window that are formed inside the crankcase of the second embodiment.

A second embodiment of the invention is described next with reference to FIGS. 4 to 6. FIGS. 4 and 5 are perspective views each showing the crankcase 1 of this embodiment. As is understood from these drawings, the partition wall 12 formed inside the crankcase 1 is provided with an upper window 21 at an upper end of the partition wall 12 and two lower windows 22 at a lower end of the partition wall, as the windows for communicating the inside and outside of the internal space 13. As shown in FIG. 6, the lower window 22 is in the form of a notch that is pointed upward on the lower end of the partition wall 12. The upper window 21 is in the form of a notch that is pointed downward from an upper end of the partition wall 12 and positioned above the lower window 22. The sum of the opening areas of the upper window 21 and lower window 22 may be equal to the opening area of the window 14 of the first embodiment.

The position of the lower window 22 in the vertical direction is set in the lowermost position within a range in the vertical direction in which the surface of the oil does not reach this lowermost position during a normal travel state of the vehicle with the maximum amount of oil within the crankcase 1. This is because forming the window as low as possible on the partition wall 12 is preferred in order to separate the oil effectively from the blow-by gas flowing from the window and passing through the internal space 13. The reason because the oil can be separated from the blow-by gas effectively by forming the window in a lower part of the partition wall 12 is that the distance in which the blow-by gas reaches the gas outflow passage 7 from the window in the internal space 13 increases, so that a larger amount of oil can separates from the passing blow-by gas by means of its self weight.

However, drastic acceleration of the automobile rises the surface of the oil accumulated in the crankcase 1, and the whole or part of the lower window 22 might be closed by the oil. Under such circumstances the oil might be drawn up from the lower window 22 into the internal space 13. Moreover, when the oil is drawn up from the lower window 22 into the internal space 13 the oil is mixed into the blow-by gas passing through the internal space 13, which might inhibit effective separation of the oil from the blow-by gas on the crankcase 1 side.

However, according to this embodiment, in addition to the effects (1) to (3) of the first embodiment, the following effects can be obtained in the above-described circumstances. (4) The distance between the lower window 22 of the internal space 13 and the gas outflow passage 7 can be increased as much as possible by forming the lower window 22 on the lower end of the partition wall 12 into a notch pointing upward, and the blow-by gas introduced from the lower window 22 into the internal space 13 can be caused to flow to the gas outflow passage 7, whereby the oil can be separated from the gas effectively.

(5) In addition to the lower window 22, the upper window 21 is formed on the partition wall 12 so that the blow-by gas flows from the upper window 21 into the internal space 13 even when the surface of the oil accumulated in the crankcase rises at the time of acceleration of the automobile and closes the whole or part of the lower window 22. This decrease a force that drawn up the oil from the lower window 22 into the internal space 13, when the surface of the oil within the crankcase 1 rises, as described above. Thus it is possible to reduce the possibility that the oil is drawn up from the lower window 22 into the internal space 13. Therefore, mixing the oil with the blow-by gas passing through the internal space 13, which is caused by drawing up the oil from the lower window 22 into the internal space 13, can be prevented so that the oil can be separated effectively from the blow-by gas on the crankcase 1 side.

Each of the above embodiments can be changed as follows. In the first and second embodiments, the internal combustion engine is not necessarily installed in inclination, and thus may be installed without an inclination such that the gas outflow passage 7 extends in the vertical direction.

In addition, in the first and second embodiments, the crankshaft 11 of the internal combustion engine may rotate in a direction opposite to that of each embodiment. The opening area of the window 14 of the first embodiment and the sum of the opening areas of the upper window 21 and lower window 22 of the second embodiment are not necessarily set as described in each embodiment.

In the first embodiment, the position of the window 14 in the vertical direction can be set in any position between the upper and lower end of the partition wall 12. It is preferred that the window 14 be formed as low as possible in terms of performing effective separation of the oil from the blow-by gas passing through the internal space 13. It is preferred that the window 14 be formed as high as possible so that the whole or part of the window 14 is not closed by the oil accumulated in the crankcase 1. Therefore, the position of the window 14 in the vertical direction is set in an optimum position in consideration of the above circumstances.

In the second embodiment, the upper window 21 may be positioned above the partition wall 12 rather than the lower window 22 and in any position other than the upper end of the partition wall 12.

What is claimed is:

1. A crankcase for an internal combustion engine, which is provided in the internal combustion engine in which blow-by gas that leaks from a combustion chamber into the crankcase is returned to an intake passage via a gas outflow passage formed in a cylinder block so as to extend in an up-down direction, the crankcase comprising:

a partition wall that is formed so as to face an inner side surface of a case outer wall which extends in the up-down direction and so as also to extend in the up-down direction;

an internal space that is connected at an upper end portion to the gas outflow passage is formed between the partition wall and the inner side surface of the case outer wall; and a window that passes through the partition wall in a horizontal direction is formed in the partition wall to provide communication between the internal space and an outside of the internal space, wherein the window includes a lower window that is formed at a lower end of the partition wall and an upper window that is formed above the lower window in the partition wall.

2. The crankcase for an internal combustion engine according to claim 1, wherein an opening area of the window is set to such a size that oil accumulated within the case is not drawn up from a lower end opening of the internal space when a surface of the oil rises as high as or to a level near the lower end opening of the internal space at the lower end of the partition wall.

3. The crankcase for an internal combustion engine according to the claim 1, wherein the internal combustion engine is obliquely installed so that the gas outflow passage is tilted with respect to a vertical direction.

4. The crankcase for an internal combustion engine according to the claim 1, wherein a crankshaft of the internal combustion engine rotates in such a direction as to stir oil accumulated in the case up toward a lower end opening of the internal space.

5. A crankcase for an internal combustion engine, which is provided in the internal combustion engine in which blow-by gas that leaks from a combustion chamber into the crankcase is returned to an intake passage via a gas outflow passage formed in a cylinder block so as to extend in an up-down direction, comprising:

a partition wall is formed so as to face an inner side surface of a case outer wall which extends in the up-down direction and so as also to extend in the up-down direction, whereby an internal space that is connected at an upper end portion to the gas outflow passage is formed between the partition wall and the inner side surface of the case outer wall, a window that passes through the partition wall in a horizontal direction is formed in the partition wall to provide communication between the internal space and an outside of the internal space; and an opening area of the window is set to such a size that oil accumulated within the case is not drawn up from a lower end opening of the internal space when a surface of the oil rises as high as or to a level near the lower end opening of the internal space at a lower end of the partition wall; wherein the window includes a lower window that is formed into a notch extending from the lower end of the partition wall and pointing upward and an upper window that is formed above the lower window in the partition wall.

* * * * *